Patented Dec. 8, 1953

2,662,035

UNITED STATES PATENT OFFICE 2,662,035

METHOD OF STAINING GLASS, GLASS STAINING COMPOSITIONS, AND STAINED GLASS ARTICLE

Ormonde S. Levi, Toledo, Ohio, assignor to Verd-A-Ray Processing Company, Toledo, Ohio, a corporation of Ohio No Drawing. Application May 13, 1953, Serial No. 354,894

32 Claims. (Cl. 117—65)

This invention relates to compositions and methods for staining glass and to the stained glass products thereby produced. More particularly, this invention is directed to the staining of soda-lime, borosilicate, lead glasses, and the like, and to the articles produced, such as stained flat ware, incandescent lamp bulbs stained to reduce the attraction of insects, for therapeutic or dark room uses, and the like.

This application is a continuation-in-part of my co-pending application Serial No. 153,749 entitled "Stained Glass and Method of Staining Same," filed April 3, 1950, now abandoned.

The art of staining to which the present invention is directed comprises the coloration of a glass surface, and is not to be confused with "colored glass," wherein the molten glass batch is colored by the addition of suitable ingredients. In this connection, so-called "stained glass" windows are actually windows composed of small pieces of colored glass.

The art of staining glass with copper and/or silver compounds is several hundred years old. Usually the copper or silver salt, or both, is mixed with a suitable ochre or dispersing agent, and enough water added to provide a slurry of the desired viscosity. This slurry is then applied to the glass surface to be stained and the article is baked at a predetermined temperature to effect staining of the glass surface. The excess "mud" is then removed by washing and scrubbing. Copper salts have been used alone on borosilicate glass to provide a yellow stain and, upon reduction of the copper, a red stain. No stain is obtained by copper salt alone on soda-lime glass. Copper and silver salts have been used in combination with one another to produce amber stains on soda-lime glass, but these stains are relatively light colored, being much too light for coloring incandescent light bulbs for therapeutic use. Also, the high temperatures required for effective staining using this stain composition, may deform the thin bulb as well as metallize the staining ingredients, this latter effect greatly reducing the amount of light and heat transmitted through the bulb.

In spite of the long period in which glass stains have been known and used, and in spite of considerable research upon staining compositions, the art of staining glass has advanced so little since early times that only a very limited number of colors can be obtained by staining, and only particular glass compositions can be used. It is for this reason that the art of staining glass is seldom practiced at the present time.

There are definite advantages, however, to staining glassware rather than coloring the entire glass batch as its now the usual practice. In the first place, partially finished glassware may be colored to order. This permits those manufacturers who provide finished articles to color their glassware independently of the operation of the manufacturer who produces the glass.

Also, large colored articles, such as stained glass windows, may be produced in one sheet of glass rather than the multi-pieced leaded windows now made, and at a lower price.

Although glass enamel is the customary medium for applying labels and for decorating glassware, stains may be readily applied and are much more permanent, lasting as long as the glass to which they are applied. This is especially important due to rigid State Statutes requiring the use of strong alkalis in cleaning bottles, etc., these alkali cleaning agents rapidly deteriorating the glass enamel but having little or no effect upon the stain. The use of stains in decorating glassware, however, has been destricted due to the limited number of colors obtainable and inability to control these colors.

An object of this invention, therefore, is to provide compositions and methods for staining glass in a variety of colors, and thus produce new and improved stained glass articles.

Another object of this invention is to provide compositions and methods for staining glass uniformly and for producing a stain having an arcurately predetermined and reproducible color.

Still another object of this invention is to provide compositions and methods for staining several types of glass, such as soda-lime, borosilicate, lead glasses, and the like, in a variety of colors and in varying shades.

A still further object of this invention is to provide compositions and methods for staining soda-lime glass at temperatures below the softening point of the glass as well as the metallizing point of the stain composition, said stains being permanent, uniform and reproducible.

A still further object of this invention is to provide stained glass articles in a variety of colors and having accurately predetermined colors which are uniform throughout the stained area.

Still another object of this invention is to provide an amber lime glass and a method of making it that may be readily employed at a temperature low enough to avoid danger of deformation of thin glass, such as the walls of an incandescent lamp bulb, and still produce a deep amber stain satisfactory for therapeutic and dark room purposes.

An additional object of this invention is to provide a method and composition for staining a borosilicate glass yellow, for such use as incandescent bulbs, etc.

Other objects and advantages of this invention will become apparent to those skilled in the art from the following detailed description thereof.

THE INVENTION IN GENERAL

It has been discovered that the combination of copper, silver and zinc salts in the presence of the chloride anion produces an active staining material for staining various types of glass. Furthermore, the color of the stain may be closely controlled by correctly proportioning the staining ingredients and by careful regulation of the baking temperatures.

To illustrate a staining composition representative of the present invention, the following example is set forth:

EXAMPLE 1

| | | |
|---|---|---|
| $AgNO_3$ | grams | 1.2 |
| ZnS | do | 9.0 |
| CuCl | do | 13.0 |
| Ochre | do | 80.0 |
| $(NH_4)_2S$ (45%) | cc | 29.0 |
| Water | cc | 120 |

In addition to the active staining ingredients ($AgNO_3$, ZnS, and CuCl) the above composition includes ochre, water and $(NH_4)_2S$.

The inclusion of ochre to disperse and to dilute the active staining material, and the use of water to provide a slurry of the desired consistency, represents the customary practice in the staining art. Other compounds, such as ammonium sulfide, sodium hydroxide, etc., may also be employed to improve the uniformity of the stain as well as the depth of color. The variation of these dispersing agents to suit the particular use is well within the knowledge of one skilled in the art, so that detailed description thereof need not be included. The present invention is primarily directed to the active staining ingredients themselves, and these ingredients will be described hereinafter in detail.

ACTIVE STAINING INGREDIENTS

As above stated, copper, zinc and silver salts combine, in the presence of the chloride anion, to produce an active staining material capable of staining various types of glass a variety of colors. Experimentation has shown that the anions of these metal salts, with the exceptions of the chloride anion, do not have any critical effect upon the staining characteristics of the combination, so that any of the salts of these metals may be used which will react with the chloride anion.

In Example 1, $AgNO_3$, CuCl and ZnS are combined to produce a material capable of staining glass. A stain may be obtained from the combination of Zn, Cu and Ag chlorides, as well as from the combination of the nitrates, sulphates, sulphides, and carbonates of those metals in the presence of the chloride anion. The acetates, hydrides and many other salts of those metals may likewise be employed, showing clearly that the Cu, Zn and Ag cations are the active portion of these salts as regards the staining characteristics of the composition. Examples containing different salts of these three metals which illustrate the use of a variety of anions, and which have successfully stained glass, are hereinafter set forth:

EXAMPLE 2

| | | |
|---|---|---|
| CuS | grams | 13.0 |
| $Ag_2S$ | do | 1.0 |
| ZnS | do | 9.0 |
| Ochre | do | 80.0 |
| HCl (37%) | cc | 1.0 |
| $H_2O$ | cc | 100 |

The above composition baked onto soda-lime glass at 1000° F. produced a good green stain.

EXAMPLE 3

| | | |
|---|---|---|
| $AgNO_3$ | grams | 1.2 |
| CuCl | do | 1.0 |
| $Cu(C_2H_3O_2)_2$ | do | 26.0 |
| $Zn(C_2H_3O_2)_2$ | do | 18.0 |
| $(NH_4)_2S$ | cc | 40 |
| Ochre | grams | 86 |

Water (to make a smooth slip, about 120 cc.).

A reddish amber was obtained on soda-lime glass at 1000° F. baking temperature. Without the CuCl, however, a dirty yellow color was obtained, due solely to the action of Cu and Ag.

EXAMPLE 4

| | | |
|---|---|---|
| $AgNO_3$ | grams | 1.2 |
| $CuCO_3$ | do | 13.0 |
| ZnS | do | 9.0 |
| $(NH_4)_2S$ | cc | 29 |
| Ochre | grams | 80 |
| HCl (37%) | cc | 2 |

Water to make a smooth slip.

A green stain was obtained on soda-lime glass at 1050° F. baking temperature.

EXAMPLE 5

Same composition as Example 4 except that an equal weight of $CuSO_4$ is substituted for the $CuCO_3$. A green stain was obtained on soda-lime glass at a baking temperature of 1050° F.

EXAMPLE 6

| | | |
|---|---|---|
| $Ag_2O$ | grams | 0.9 |
| CuCl | do | 13.0 |
| ZnS | do | 9.0 |
| $(NH_4)_2S$ | cc | 29 |
| Ochre | grams | 80 |

Water to make a smooth slip.

A mixture of red and green stain was obtained by baking this composition onto soda-lime glass at 1050° F.

EXAMPLE 7

| | | |
|---|---|---|
| $AgNO_3$ | grams | 1.2 |
| CuCl | do | 13.0 |
| $ZnCO_3$ | do | 9.0 |
| $(NH_4)_2S$ | cc | 29 |
| Ochre | grams | 80 |

Water to make a smooth slip.

A very good light green stain was obtained on soda-lime glass at 1050° F. baking temperature.

EXAMPLE 8

| | | |
|---|---|---|
| $AgNO_3$ | grams | 1.2 |
| ZnS | do | 9.0 |
| CuS | do | 13.0 |
| KCl | do | 3.0 |
| $(NH_4)_2S$ | cc | 29 |
| Ochre | grams | 80 |

Water to make a smooth slip.

A very good green stain resulted upon baking this composition on soda-lime glass at 1050° F. Here the chloride anion is furnished by the KCl. Substitution of 3 grams of either KI or $NH_4HF_2$ for the KCl in this composition destroys its staining characteristics, thus showing that the iodide and fluoride anions are not equivalent in this case to the chloride anion.

Although the salts of copper, silver and zinc are generally applicable, salts wherein the metal cation predominates, or approximates 50% by weight of the salt, are much to be preferred over salts having extremely large anions. The reason for this preference is due to the dilution effect of the large anions upon the concentration of the metal component or ion which effects the staining of the glass. Thus, the cuprous compounds are preferred rather than the cupric because there is a higher percentage of copper in the former than in the latter. Salts of the strong mineral acids are particularly satisfactory, since the anion portion of the salt is never materially heavier than the metal portion, and such salts are readily ionizable.

Since the copper, silver and zinc ions form the active staining portion of their respective salts, the relative amounts of these ingredients may best be defined by reference to the relative percentages by weight of copper, silver and zinc present, these percentages based upon the total weight of those three metal ions, calculated as metals.

Staining compositions can be obtained by combining Cu, Ag and Zn ions in widely varying proportions, and there are no sharp limits delineating compositions which will stain glass and those which will not. It is essential, however, that all three metal cations be present, since the absence of any one is fatal to the improved staining characteristics attained by the combinations of the three, as illustrated by the following examples.

|  | Example 9 | Example 10 | Example 11 |
|---|---|---|---|
| $CuCl$ grams | 0 | 13 | 13 |
| $AgNO_3$ do | 1.2 | 0 | 1.2 |
| $ZnS$ do | 9.0 | 9.0 | 0 |
| $(NH_4)_2S$ (45%) cc | 29 | 29 | 29 |
| Ochre grams | 80 | 80 | 80 |
| $H_2O$ cc | 120 | 120 | 120 |

These staining compositions were applied to soda-lime glass and the coated glass then heated in an oven to 1000° F. After attaining this temperature the coated glass was removed from the oven and washed. The following table records the results:

*Table 1*

| Example number | Percent Cu | Percent Ag | Percent Zn | Color of stain |
|---|---|---|---|---|
| 9 | 0 | 89.0 | 11.0 | No stain. |
| 10 | 58.0 | 0 | 42.0 | Very light straw color. |
| 11 | 91.57 | 8.43 | 0 | Amber. |

When copper was omitted no stain at all was obtained, while the omission of zinc produced merely the usual light amber stain from the copper-silver combination. The straw color obtained when silver is omitted is a very faint tint that may be due to the combination of zinc and copper or to slight impurities.

The addition of 0.2 gram $AgNO_3$ to the composition of Example No. 10, 0.25 gram of ZnS to the composition of Example No. 11, and 2 grams CuCl to the composition of Example No. 9, produced the remarkable stains recorded in Table 2, when the coated glass was baked at 1000° F. according to staining procedure above outlined:

*Table 2*

| Composition | Percent Cu | Percent Ag | Percent Zn | Color of stain |
|---|---|---|---|---|
| Example 9+2 grams CuCl. | 15.8 | 9.6 | 74.6 | Yellow. |
| Example 10+0.2 gram $AgNO_3$. | 57.0 | .875 | 41.3 | Slightly yellow green. |
| Example 11+0.25 gram ZnS. | 90.0 | 8.20 | 1.80 | Trace of green. |

It is apparent from Table 2 that as little as .875% Ag and 1.8% Zn will completely change the staining characteristics of the composition, since a green stain is obtained which is impossible to achieve by using any one of those metal salts alone or the combination of any two of these metal salts. The same remark applies to the yellow stain obtained by the addition of 15.8% Cu, since this yellow stain is completely different from the amber obtained from the combination of copper and silver. By adding 5 grams CuCl in place of the 2 gram addition, a light medium red stain is obtained upon heating to 1000° F.

While the minimum amount of each of the three metal ions will vary slightly depending upon the other components of the staining composition, at least about .875% Ag, at least about 1.8% Zn, and at least about 15% Cu are required to produce an active staining material having the improved staining characteristics herein described. For preferred results, the lower limit of Ag should be about 2.5%; the lower limit of Zn should be about 20%; and the lower limit of Cu should be about 40%. Best commercial stains are produced when the Ag content is from 2.5% to 10%. The particle size of these staining ingredients is important, since larger particles do not react as quickly or as thoroughly as do the smaller particles. In the above example using 0.25 gram of ZnS, the particle size was —300 mesh. When a particle size of —150 mesh is used, 1 gram of ZnS is required to obtain a green stain.

The maximum amounts of each of these metal ions is established, in part, by the minimals of the other two, but over 21% Ag has no apparent beneficial effect upon the staining properties of the composition. With the usual grade of zinc salts, such as ZnS, dependable stains are difficult to obtain when over 70% Zn is present, but the use of extremely finely divided ZnS, for example, permits as high as 85% Zn to be employed. Copper in amounts as high as 90% may be employed, but about 85% Cu is preferred as an upper limit.

In addition to the copper, silver and zinc ions, it is necessary that at least a certain amount of a chloride compound be present. In the examples, above set forth, cuprous chloride usually furnished copper ions and constituted the chloride compound, although Example 2 and others show the addition of HCl for the latter purpose. Since, in the particular examples given, it is the chloride anion itself which is essential, the particular salt or acid which provides this anion is not critical. The most obvious procedure, of course, is the use of HCl or the chlorides of copper, silver or zinc. Chlorine gas can be used, but this gas forms HCl in aqueous solution and it is the chloride anion thus formed that is effective.

In determining the minimum amount of chloride anion required to develop the new and improved stain, 37% HCl in varying amounts was added to a base composition of 13 grams CuS, 1 gram $Ag_2S$, 9 grams ZnS, 80 grams ochre and about 100 cc. water. Table 3 shows the results of stain tests run on soda-lime glass at a temperature of 1000° F., as above described, and the percent of chloride anion is based on total amount of Cu, Zn and Ag ions present, calculated as metals.

*Table 3*

| Composition | Percent Cl | Color |
|---|---|---|
| Base composition | 0 | Very faint straw color. |
| Base composition plus 0.5 cc. HCl. | 1.4 | Slight pale green. |
| Base composition plus 1.0 cc. HCl. | 2.8 | Good green stain. |
| Base composition plus 2.0 | 5.6 | Do. |
| Base composition plus 3.0 | 8.4 | Green stain becoming darker. |
| Base composition plus 4.0 | 11.2 | Do. |
| Base composition plus 10.0 | 28.0 | Do. |

The presence of as little as 1.4% of chloride anion causes a slight green to appear in the stain, showing that the combination of the three metal ions with the chloride anion is beginning to take effect. When 2.8% chloride anion is present, a good green stain is obtained. Additional amounts of this anion do not produce any material change in the staining properties of the stain composition other than a slight darkening, until the amount thereof exceeds about 115% based upon the total amount of copper, silver and zinc, calculated as metals. Chloride anion above about this percentage causes etching of the glass and deterioration of the stain color and is, therefore, undesirable. Accordingly any amount of chlorine from 1.4% to about 115% calculated as indicated, is satisfactory. Ordinarily, for practical reasons from about 2.8% to about 20% of chlorine is preferred.

ADDITIONAL INGREDIENTS FOR STAIN COMPOSITION

While the active staining ingredients may be used by themselves to produce a stain on glass, much more satisfactory results are obtained when other ingredients are added. Thus, 13 grams $CuCl$, 1.2 grams $AgNO_3$, 9 grams $ZnS$ and sufficient water to make a slip were admixed, applied to a soda-lime glass surface and baked to 1050° F. to produce a deep green stain. The glass surface is etched, however, and a more uniform stain of a good green color is obtained by adding 80 grams of ochre to the above composition.

Ochre is a standard ingredient for most stain compositions and is both cheap and readily available. The primary function of ochre is to disperse and to dilute the active staining ingredients, as well as to give body to the stain composition to assist in its application to the glass surface. The composition of the ochre used in the examples set forth in this specification is as follows:

| | Percent |
|---|---|
| Ferric oxide | 52.52 |
| Silica | 26.37 |
| Alumina | 11.05 |
| Moisture | .81 |
| Loss on ignition | 9.25 |

The exact composition of the ochre is a matter of choice, but a particular ochre should be selected and standardized if accurate reproduction of stain colors is to be achieved, since the ochre composition does have some effect upon the color of the stain. The amount of dispersing agent will vary with the composition of the active staining ingredients, but must be controlled within certain limits, since an extremely wide range may even vary the color of the stain, due to the dilution effect. Other dispersing agents may be used, but ochre is preferred because of its low cost and availability.

In order to obtain the most desirable depth of color, it is preferable to add at least one of the metals, copper, silver and zinc, as the sulphide. Rather than add the metal as a sulphide per se, a sulphide may be added to a mixture of metal salts in amounts sufficient to combine with one or more of the metals. Best results are obtained when sufficient sulphide is added to combine with all of the copper and silver present, although very good results are obtained when a single metal is added as a sulphide, such as zinc sulphide. When the sulphide is added to the mixture of metal salts, a decomposable sulphide, such as ammonium sulphide, is preferred. However, other sulphides, such as sodium sulphide, may be used. To date, the greatest depth of color has been obtained when the zinc was added as zinc sulphide and sufficient ammonium sulphide added to theoretically combine with all of the copper and silver present. Effective staining may be produced, however, without any sulphide present.

The addition of a slight amount of sodium hydroxide, such as 0.5% or less, has been found in some instances to assist in producing a uniform stain, while in other cases the additive is preferably omitted. Although the exact function of the sodium hydroxide is not known, the desirability of its use is believed to depend upon the availability of sodium in the glass surface to be stained. When little sodium is available in the glass surface, the addition of sodium hydroxide is recommended.

Water is employed in amounts sufficient to form the staining composition into a slip having the desired consistency. The consistency or viscosity of the staining slip will vary with the intended use. When a flat surface is to be stained, a relatively thin or low viscosity slip may be employed satisfactorily. When a curved surface, such as a lamp bulb, is to be stained a more viscous slip must be provided in order to be retained in a uniform layer upon the curved surface. The amount of water will also vary considerably with the particular ingredients of the stain. For example, much less water is required for a stain in which the dispersing agent or ochre has been omitted than in one which contains a large amount of ochre. Since the amount of water required varies with both the end use and the stain composition, no practical limitations therefor can be set forth, but anyone skilled in the art may readily determine by routine experiment that proportion of water which is most desirable under any given circumstances.

METHODS OF MAKING AND APPLYING THE STAIN COMPOSITION

The various ingredients of the stain composition may be combined by a number of different procedures, none of which appears to materially affect the staining characteristics of the resulting composition. One procedure which has been found to be highly satisfactory for preparing the staining composition, is to grind the various components of the stain in a ball mill containing porcelain balls. The silver salt, if soluble, and the sodium hydroxide may be pre-dissolved and added to the ball mill in solution form. Approximately half of the total amount of water to be added to the composition is added to the components in the ball mill. The stain ingredients are ground until they will pass through a 200-mesh screen, at which time the remaining portion of the water is added to make a slurry of the desired consistency. The particle size of the active staining ingredients affects the staining properties of the composition, as above noted. When an oil dispersion to provide an oil base paint is to be made for use in applying a staining composition by the silk screen process, for example, the above procedure may be followed, but the ground mixture is dried and ground with oil to produce the oil dispersion or oil base paint.

The stain composition is applied to the surface of the article to be stained either by dipping, spraying, brushing, screening, or the like. The dipping procedure is fast and adaptable to automatic assembly line procedure. Control of the viscosity of the slurry, however, is required in order to obtain a coating of the stain composition of optimum thickness. When the stain coating or "mud" is too thick, cracks form during the baking procedure which ultimately show up in the finished article as unstained lines. If the slurry is too thin, the stain may not be continuous or may be too light due to low concentration of the active staining ingredients. Routine experiment will establish the satisfactory viscosity for any particular operation. If the staining composition is to be applied by means of a brush or screen, as in the production of labels and the like, an oil base paint may be made by grinding the ingredients in oil.

In the baking operation, fairly close control of the temperature of the glass must be maintained to obtain the desired, predetermined color. The temperature employed will be determined in part by the melting or softening point of the glass being stained, but temperatures in excess of 1100° F. destroy the staining composition by metallizing the metal salts. Since there is considerable lag in temperature rise between the oven air and the glass body, temperatures should be taken directly from the glass surface that is being stained. Indirect heating or heating by conduction is preferred to direct heating by radiation, since more uniform heating of all sides of the article to be stained may be obtained. In baking the "mud" coated article, the article is placed in an oven and heated slowly to a predetermined temperature, such as 900° F. If the glass article is relatively thin so that no strains will develop, it may then be immediately removed from the oven and allowed to cool in the air. For thicker articles, such as heavy bottles or flatware, cooling should be gradual. The "mud" is then removed by washing and brushing and the finished stained article obtained. Throughout this specification the staining temperatures specified are the temperatures to which the glass surface has been heated, and the above described staining procedure is employed unless otherwise stated.

For best results in staining aged glass or glass which contains decolorants, such as selenium and antimony, a prebaking process is quite advantageous. The glass surface to be stained is heated to a temperature slightly in excess of that which is to be used in the staining operation and then allowed to cool. The heat treated surface may then be washed and is subsequently stained as above described. Much deeper stains result when this prebaking step is employed on the aged glass or glass containing decolorants than when the glass is directly stained without this preliminary step.

COLOR OF STAINS

Stain compositions comprising the present invention have the remarkable property of producing a variety of stains upon many different types of glass surfaces. Also, these stain compositions produce colors never before obtained in glass stains. Numerous factors are interrelated in determining the color of the stain produced. The respective amounts of the four active staining ingredients present, and particularly the amount of silver, plays a major role in color determination. The baking is another factor which may be employed to control the color of the stain. As above indicated, the amount and type of ochre, the type of glass, the presence of sulphides, and the particle size of the active staining ingredients also affect the color of the stain to a lesser degree, and so must be standardized to obtain careful color control and to reproduce a given color.

An amber color stain is obtained when the baking temperature ranges from 800° F. to 925° F., regardless of the particular amounts of the active staining ingredients. When the Ag ion is present in amounts over 21% (of Cu, Zn, Ag total), an amber is obtained at any baking temperature between 800° F. and 1100° F., the upper limit established by the decomposition point of the staining ingredients. With staining compositions containing less than 21% Ag ion, a red or green stain is obtained at baking temperatures between 925° and 1100° F., depending upon the composition of the stain. Red stains may be obtained even with the lower amount of Ag ion, which usually produces a green stain, by carefully maintaining the baking temperature just below 1000° F., but such a procedure is difficult to follow and mixed colors frequently are obtained.

The predominant factor in controlling the color of the stain is the percentage of the three metal ions, Ag, Zn and Cu. To illustrate the effect of these metal ions on the color, a series of tests was run in which 80 grams of ochre (composition above set forth) and 29 cc. of 45% $(NH_4)_2S$ solution were employed in each composition. Soda-lime glass was used having an analysis of 73.50% $SiO_2$, 1% $R_2O_3$, 16.5% $Na_2O$, 0.15% $K_2O$, 0.89% $B_2O_3$, 4.82% CaO and 3.33% MgO. The following table shows the various formulations employed.

Table 4

| Formula number | $AgNO_3$ (grams) | ZnS (grams) | CuCl (grams) | $H_2O$ (cc.) |
| --- | --- | --- | --- | --- |
| 1 | 0 | 9.0 | 13.0 | 120 |
| 2 | .2 | 9.0 | 13.0 | 120 |
| 3 | .4 | 9.0 | 13.0 | 120 |
| 4 | .8 | 9.0 | 13.0 | 120 |
| 5 | 1.2 | 9.0 | 13.0 | 120 |
| 6 | 1.6 | 9.0 | 13.0 | 120 |
| 7 | 2.0 | 9.0 | 13.0 | 120 |
| 8 | 2.4 | 9.0 | 13.0 | 120 |
| 9 | 2.8 | 9.0 | 13.0 | 120 |
| 10 | 3.2 | 9.0 | 13.0 | 120 |
| 11 | 3.6 | 9.0 | 13.0 | 120 |
| 12 | 4.0 | 9.0 | 13.0 | 120 |
| 13 | 4.4 | 9.0 | 13.0 | 120 |
| 14 | 4.8 | 9.0 | 13.0 | 120 |
| 15 | 6.0 | 9.0 | 13.0 | 120 |
| 16 | 8.0 | 9.0 | 13.0 | 120 |
| 17 | 10.0 | 9.0 | 13.0 | 120 |
| 18 | 12.0 | 9.0 | 13.0 | 120 |
| 19 | 1.2 | 0 | 13.0 | 120 |
| 20 | 1.2 | .25 | 13.0 | 120 |
| 21 | 1.2 | .5 | 13.0 | 120 |
| 22 | 1.2 | 1.0 | 13.0 | 120 |
| 23 | 1.2 | 1.5 | 13.0 | 120 |
| 24 | 1.2 | 3.0 | 13.0 | 120 |
| 25 | 1.2 | 6.0 | 13.0 | 123 |
| 26 | 1.2 | 9.0 | 13.0 | 125 |
| 27 | 1.2 | 12.0 | 13.0 | 127 |
| 28 | 1.2 | 30.0 | 13.0 | 150 |
| 29 | 1.2 | 40.0 | 13.0 | 160 |
| 30 | 1.2 | 9.0 | 0.0 | 120 |
| 31 | 1.2 | 9.0 | 5.0 | 120 |
| 32 | 1.2 | 9.0 | 10.0 | 120 |
| 33 | 1.2 | 9.0 | 15.0 | 120 |
| 34 | 1.2 | 9.0 | 20.0 | 122 |
| 35 | 3.6 | 0 | 13.0 | 120 |
| 36 | 3.6 | 1.0 | 13.0 | 120 |
| 37 | 3.6 | 3.0 | 13.0 | 120 |
| 38 | 3.6 | 5.0 | 13.0 | 120 |
| 39 | 3.6 | 7.0 | 13.0 | 120 |
| 40 | 3.6 | 9.0 | 13.0 | 120 |
| 41 | 3.6 | 15.0 | 13.0 | 140 |
| 42 | 3.6 | 20.0 | 13.0 | 150 |

The various ingredients of the formulations shown in Table 4 above were ground to −200 mesh in a ball mill and the resulting slurry or "mud" applied to the soda-lime glass surface by dipping. A thermocouple embedded in the glass adjacent the coated surface measured the temperature of the article when placed in a radiation type oven converted to indirect heating by placing slats in the front of the radiation elements. In each case, baking was halted as soon as the glass surface reached 1000° F. After removal of the "mud," the color of the stain was checked by transmitted light, and the following results obtained:

The addition of Zn from 0 to 74.6% is shown in Formulae Nos. 19 to 29, inclusive. The ZnS used for this series of tests was too coarse to obtain the best results, so that as a consequence 6.9% Zn was required to obtain a green stain. No red stain was obtained because the Ag was always less than 8.43%. Red stains are produced by the addition of Zn to compositions containing larger amounts of Ag, as is shown in Formulae Nos. 35 to 42, in-

*Table 5*

| Formula Number | Percent Ag | Percent Zn | Percent Cu | Baking temperature, °F. | Color | Remarks |
|---|---|---|---|---|---|---|
| 1 | 0 | 42.0 | 58.0 | 1,000 | Very light straw | Dirty or foggy. |
| 2 | .875 | 41.6 | 57.525 | 1,000 | Light green | |
| 3 | 1.7 | 41.3 | 57.0 | 1,000 | Bright yellow green | |
| 4 | 3.4 | 40.6 | 56.0 | 1,000 | Good medium green | |
| 5 | 5.04 | 39.85 | 55.01 | 1,000 | Very good green | |
| 6 | 6.61 | 39.25 | 54.14 | 1,000 | Slightly darker green | |
| 7 | 8.12 | 38.63 | 53.25 | 1,000 | Mixed red and green | Red color appearing and becoming stronger with green. |
| 8 | 9.59 | 37.95 | 52.46 | 1,000 | Same | |
| 9 | 10.92 | 37.43 | 51.65 | 1,000 | Red increasing | |
| 10 | 12.38 | 36.81 | 50.81 | 1,000 | Red becoming deeper | Gradually diminishing. |
| 11 | 13.8 | 36.2 | 50.0 | 1,000 | Red deepening | Beyond this point little if any improvement develops. |
| 12 | 14.96 | 35.75 | 49.29 | 1,000 | Same | |
| 13 | 16.3 | 35.2 | 48.5 | 1,000 | do | |
| 14 | 17.52 | 34.65 | 47.83 | 1,000 | do | |
| 15 | 21.0 | 32.2 | 45.8 | 1,000 | Amber | Amber stains gradually develop from the red stains and improve to this point. Increased amounts of silver do not improve the color. |
| 16 | 26.1 | 31.1 | 42.8 | 1,000 | do | |
| 17 | 30.6 | 29.2 | 40.2 | 1,000 | do | |
| 18 | 34.3 | 27.7 | 38.0 | 1,000 | do | |
| 19 | 8.43 | 0 | 91.57 | 1,000 | do | |
| 20 | 8.20 | 1.80 | 90.0 | 1,000 | do | |
| 21 | 8.1 | 3.5 | 88.4 | 1,000 | do | |
| 22 | 7.8 | 6.9 | 85.3 | 1,000 | Trace of green | |
| 23 | 7.55 | 9.95 | 82.5 | 1,000 | Red and green mixed | |
| 24 | 6.85 | 18.15 | 75.0 | 1,000 | Red disappearing green better | |
| 25 | 5.80 | 30.7 | 63.5 | 1,000 | do | |
| 26 | 5.01 | 40.0 | 55.0 | 1,000 | Very good green | |
| 27 | 4.4 | 47.0 | 48.6 | 1,000 | Color becoming muddy | |
| 28 | 2.5 | 69.0 | 28.5 | 1,000 | Slight trace of green left | |
| 29 | 2.2 | 74.6 | 23.2 | 1,000 | No green but a stain exists which is milky in appearance. | |
| 30 | 11.0 | 89.0 | 0 | 1,000 | No staining | |
| 31 | 7.60 | 60.4 | 32.0 | 1,000 | Light medium red | |
| 32 | 5.76 | 45.82 | 48.42 | 1,000 | Green | |
| 33 | 4.64 | 36.78 | 58.58 | 1,000 | Very good green | |
| 34 | 3.89 | 30.9 | 65.2 | 1,000 | do | |
| 35 | 21.5 | 0 | 78.5 | | Light amber | |
| 36 | 20.2 | 5.95 | 73.85 | | Slightly darker amber | |
| 37 | 17.95 | 15.95 | 66.1 | | Assuming a red tone | |
| 38 | 16.4 | 24.2 | 49.4 | | Red becoming stronger | |
| 39 | 14.93 | 30.64 | 54.4 | | Fair red | |
| 40 | 13.65 | 36.2 | 50.3 | | Red deeper | |
| 41 | 11.0 | 48.6 | 40.4 | | Red fading out | |
| 42 | 9.5 | 55.95 | 34.64 | | Same as 41 | |

Table 5 shows clearly that a binary mixture of Cu and Ag (Nos. 35, 19) produces only the expected amber stain, while binary mixtures of Cu with Zn (No. 1) and Zn with Ag (No. 30) produce no stain at all. Formulae Nos. 1 to 18, inclusive, disclose the effect of increasing the percent of Ag ion from 4 to 34.3%. Less than 1% Ag introduces a green color into the stain, while further additions up to about 8% darkens the green color. The transition point from green to red is from about 8% Ag to about 10% Ag, and above 10% Ag but under 21% Ag produces a red stain. Over 21% Ag an amber stain is obtained, even at a baking temperature of 1000° F., and little change is obtained by increasing the silver above this percentage.

While this transition from green to red to amber is true generally of increased amounts of silver, the Ag% at which these changes occur will vary somewhat with the ratio of Cu to Zn. For example, Formulae Nos. 12 and 39 have almost identical amounts of silver, but a shift of 5% less Zn and 5% more Cu decreases the redness of the stain.

clusive. In these compositions the color of the stain changes from amber to red as the Zn increases, but no green appears due to the high percentage of silver. Large amounts of Zn appear to reduce the intensity of the stain.

Formulae Nos. 30 and 34, inclusive, show that increasing amounts of Cu ion deepen the stain and the larger amounts, 55% Cu and above, are desirable. Preferably the Cu ion is present in an excess over the Zn ion by about 10%, since the deepest stains are usually obtained when this proportion is maintained.

The red stain obtained with the higher percentages of Ag ion may be deepened, and a broader range of Ag ion used, by prebaking the glass surface to 1100° F. and then cooling. After washing the glass surface, the stain composition is subsequently applied in accordance with this invention, and a very deep red may be obtained.

A series of tests was run to illustrate that water insoluble chloride compounds, both organic and inorganic, can be used as the sole source for chlorine in producing stains according to the invention. In carrying out the tests the ingredients indicated in Table 6, below, were blended with 130 cc. of water and 80 grams of ochre of composition set forth above, and the resulting dispersion was applied to a soda-lime glass of analysis as set forth above.

Table 6

| Formula number | Silver salt (grams) | Zinc salt (grams) | Copper salt (grams) | Chloride compound (grams) |
|---|---|---|---|---|
| 43 | AgCl 1.6 | ZnS 9.0 | CuS 13.0 |  |
| 44 | $Ag_2S$ 2.62 | ZnS 9.0 | CuS 13.0 |  |
| 45 | $Ag_2S$ 2.62 | ZnS 9.0 | CuS 13.0 | $HgCl_2$ 1.00. |
| 46 | $Ag_2S$ 2.62 | ZnS 9.0 | CuS 13.0 | $HgCl_2$ 2.00. |
| 47 | $Ag_2S$ 1.0 | ZnS 9.0 | CuS 13.0 | Benzyl chloride 15.00. |
| 48 | $Ag_2S$ 1.0 | ZnS 9.0 | CuS 13.0 | Trichloro acetic acid 6.00. |

After application of the slurry, baking to 1000° F., and removal of the "mud" as hereinafter described, the color of the stain produced by each of the formulae set forth in Table 6 was checked by transmitted light. Formula 43 gave a commercially acceptable pale green stain. Formula 44, which is presented for purposes of comparison only, and is not within the scope of the invention because it contains no chloride compound, was a very pale straw color. Formula 45 produced definite staining of an amber color, and Formula 46 was a dark amber stain assuming a reddish tone. Formulae 47 and 48 gave commercially satisfactory green stains. Formula 45 contained 1.67 per cent of chlorine based on the total of copper, silver and zinc, calculated as metals. Formula 43 contained 2.45 per cent of chlorine based upon the total of copper, silver and zinc, calculated as metals. It is usually preferred that the chloride compound employed be an inorganic chloride compound, although Formulas 47 and 48 in Table 6, above, show the use of organic chloride compounds. Most desirably, the chloride compound employed, in addition to being water soluble, is also ionizable so that, in water solution, it releases chloride anions.

The chemical mechanism which is responsible for staining of glass according to the method of the invention is not understood. It has definitely been established that each element of the combination of active staining ingredients is required. When water is used as the dispersing liquid it appears to be essential that there be a chloride compound dissolved in the water in the proportion above set forth. For example, when a staining technique was carried out identical with that described in connection with Formula 43, above, except that the CuS was replaced by copper hydrate, and the ZnS was replaced by 11 grams of zinc carbonate, substantially no staining was achieved. This result is explainable on the theory that the zinc sulphide used in Formula 43 reacted with the silver chloride to form silver sulphide and zinc chloride, and that the water soluble chloride compound (zinc chloride) is required for the desired result.

Similarly, virtually no color was observed when 2-ethylhexyl chloride was substituted for the benzyl chloride reported in Formula 48, and only a faint color when ethylene dichloride was substituted therefor. Also, when trichloroethane was substituted for the benzyl chloride of Formula 47, a light grey green color resulted. However, when ethylene chlorohydrin, which is readily soluble in water, was substituted for the benzyl chloride, a good green stain was achieved.

Furthermore, when Formula 47 was repeated using copper hydrate, silver nitrate, and zinc carbonate, in place of copper sulphide, silver sulphide, and zinc sulphide, no staining was observed. If however, Formula 48 is varied by replacing the silver sulphide, zinc sulphide, and copper sulphide by silver nitrate, zinc carbonate, and copper hydrate, a good yellow stain is produced. Although the invention is not limited to any theoretical explanation suggested, it is believed that, when benzyl chloride is the sole source for chlorine in a staining composition, satisfactory results are achieved if there is a sulphide present because such sulphide must react with the benzyl chloride to release the chlorine therein in a water soluble form. When, however, water soluble trichloroacetic acid is employed as the source for chlorine, such reaction is not required for satisfactory staining.

Accordingly, it appears to be essential that the staining composition contain a water soluble chloride compound. It seems to be immaterial whether this water soluble chloride compound is organic or inorganic, although, as previously indicated, it is usually preferred to use an inorganic chloride compound for economic reasons. The water soluble chloride compound can be added as such, or can be formed in the aqueous dispersion by reaction between a water-insoluble chloride compound added, and some other ingredient thereof.

STAINING DIFFERENT GLASSES

Stain compositions of the present invention are useful, not only in the staining of soda-lime glass, but other types as well, including lead glass, borosilicate glass, etc. Different colors are obtained on different types of glasses, as is shown in the following examples:

EXAMPLE 12

| | | |
|---|---|---|
| CuCl | grams | 13 |
| $AgNO_3$ | do | 1.2 |
| ZnS | do | 9.0 |
| $(NH_4)_2S$ | cc | 29 |
| Ochre | grams | 80 |
| $H_2O$ | cc | 120 |

As shown in Tables 4 and 5 above, Formula No. 5, the above composition, produced a very good green stain on soda-lime glass. Following the same procedure on lead glass, the above composition produced a red stain. On borosilicate glass a yellow stain was obtained with the same stain composition and procedure.

EXAMPLE 13

| | | |
|---|---|---|
| CuCl | grams | 13 |
| $AgNO_3$ | do | 3.6 |
| ZnS | do | 9 |
| $(NH_4)_2S$ | cc | 29 |
| Ochre | grams | 80 |
| $H_2O$ | cc | 120 |

This stain composition (Formula No. 11 in Tables 4 and 5 above) stains soda-lime glass, red, while a yellow stain is produced on lead glass and borosilicate glass. In staining borosilicate glass, the "mud" coated glass may be baked at 1100° F. for ten minutes to produce a very good yellow stain, useful in producing yellow colored borosilicate light bulbs, for example. It should be noted as a precaution in selecting a glass surface to be stained that glasses containing decoloring agents, such as antimony and selenium should be avoided, since these metals appear to interfere with the staining operation.

THE ARTICLE

As has been above stated, the stained glass article produced in accordance with the present invention may be stained a variety of colors which are distinct from those obtainable by use of prior art processes or compositions. Also, the raw article produced has a different surface composition, since spectrographic analysis has established the existence of the chloride anion in the glass surface in addition to Cu and Ag. Zn does not appear in the glass surface, so that it must act as a catalyst of some type.

Having described the invention, I claim:

1. A method of staining glass surfaces which comprises forming a finely divided, uniform aqueous dispersion containing copper, silver and zinc salts and a water-soluble chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent, coating a glass surface with a dispersion containing the copper, silver and zinc salts and the water-soluble chloride compound, and heating the coated glass surface to at least 800° F., but not more than 1100° F. to produce a stained glass surface.

2. A method of staining a lime glass surface which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent, coating a lime glass surface with said dispersion, and heating the coated glass surface to at least 800° F., but not more than 1100° F. to produce a stained glass surface.

3. A method of staining a lead glass surface which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent, coating a lead glass surface with said dispersion, and heating the coated glass surface to at least 800° F., but not more than 1100° F., to produce a stained glass surface.

4. A method of staining a borosilicate glass surface which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent, coating a borosilicate glass surface with said dispersion, and heating the coated glass surface to at least 800° F., but not more than 1100° F. to produce a stained glass surface.

5. A method of staining lime, lead and borosilicate glass surfaces which comprises forming a finely divided, uniform aqueous dispersion containing copper, silver and zinc salts and a water-soluble inorganic chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent, converting the copper, silver and zinc salts in said dispersion to the respective sulfides, coating a glass surface with said dispersion, and heating the coated glass surface to at least 800° F., but not more than 1100° F. to produce a stained glass surface.

6. A method of staining lime, lead, and borosilicate glass surfaces which comprises forming a finely divided, uniform aqueous dispersion containing copper, silver and zinc salts and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 1.7 per cent, and dissolved chlorine, based on the total amount of copper, silver, and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

7. A method of staining lime, lead, and borosilicate glass surfaces which comprises forming a finely divided, uniform aqueous dispersion containing coppper, silver and zinc salts wherein the copper, silver and zinc cations constitute at least about 50 per cent of the respective salts, and a water-soluble inorganic chloride compound, in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 1.7 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

8. A method of staining lime, lead, and borosilicate glass surfaces which comprises forming a finely divided, uniform aqueous dispersion containing copper, silver and zinc salts of strong mineral acids and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 1.7 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

9. A method of staining lime, lead, and borosilicate glass surfaces which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent and zinc at least about 1.7 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

10. A method of staining lime, lead, and borosilicate glass surfaces which comprises forming a finely divided, uniform aqueous dispersion containing copper, silver and zinc salts and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 20 per cent, and dissolved chlorine, based on the total amount of copper, silver and zinc present, calculated as metals, constitutes at least 1.4 per cent but not more than about 115 per cent, coating a glass surface with said dispersion, and heating the coated glass surface to at least 800° F., but not more than 1100° F. to produce a stained glass surface.

11. A method of staining lime, lead, and borosilicate glass surfaces which comprises forming a finely divided, uniform aqueous dispersion containing copper, silver and zinc salts wherein the copper, silver and zinc cations constitute at least about 50 per cent of the respective salts, and a water-soluble inorganic chloride compound, in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 20 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

12. A method of staining lime, lead, and borosilicate glass surfaces which comprises forming a finely divided, uniform aqueous dispersion containing copper, silver and zinc salts of strong mineral acids and a water-soluble inorganic chloride compound in amounts sufficient to stain glass, and in proportions such that, based on the total amount of copper, silver and zinc present, calculated as metals, copper constitutes from about 40 per cent to about 85 per cent, silver constitutes from about 0.875 per cent to about 21 per cent, and zinc at least about 20 per cent, and chlorine, based on the total amount of copper, silver and zinc present, calculated as metals, constitutes at least 2.8 per cent but not more than about 115 per cent coating a glass surface with said dispersion, and heating the coated glass surface to at least 800° F., but not more than 1100° F. to produce a stained glass surface.

13. A method of staining lime, lead, and borosilicate glass surfaces which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, zinc at least about 20 per cent, and dissolved chlorine, based on the total amount of copper, silver and zinc present, calculated as metals, constitutes at least 1.4 per cent but not more than about 115 per cent, coating a glass surface with said dispersion, and heating the coated glass surface to at least 800° F., but not more than 1100° F. to produce a stained glass surface.

14. A method of staining lime, lead, and borosilicate glass surfaces which comprises forming a finely divided, uniform aqueous dispersion containing copper, silver and zinc salts and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 2.5 per cent to about 21 per cent, and zinc at least about 20 per cent, and dissolved chlorine, based on the total amount of copper, silver and zinc present, calculated as metals, constitutes at least 1.4 per cent but not more than about 115 per cent, coating a glass surface with said dispersion and heating the coated glass surface to at least 800° F., but not more than 1100° F. to produce a stained glass surface.

15. A method of staining lime, lead, and borosilicate glass surfaces which comprises forming a finely divided, uniform aqueous dispersion containing copper, silver and zinc salts wherein the copper, silver and zinc cations constitute at least about 50 per cent of the respective salts, and a water-soluble inorganic chloride compound, in amounts sufficient to stain glass, and in proportions such that, based on the total amount of copper, silver and zinc present, calculated as metals, copper constitutes from about 40 per cent to about 85 per cent, silver from about 2.5 per cent to about 21 per cent, and zinc at least about 20 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

16. A method of staining lime, lead, and borosilicate glass surfaces which comprises forming a finely divided, uniform aqueous dispersion containing copper, silver and zinc salts of strong mineral acids and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 2.5 per cent to about 21 per cent, and zinc at least about 20 per cent, and dissolved chlorine, based on the total amount of copper, silver and zinc present, calculated as metals, constitutes at least 2.8 per cent but not more than about 115 per cent, coating a glass surface with said dispersion, and heating the coated glass surface to at least 800° F., but not more than 1100° F. to produce a stained glass surface.

17. A method of staining lime, lead, and borosilicate glass surfaces which comprises forming a finely divided, uniform aqueous dispersion containing copper, silver and zinc sulfides and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 2.5 per cent to about 21 per cent, and zinc at least about 20 per cent, and dissolved chlorine, based on the total amount of copper, silver and zinc present, calculated as metals, constitutes at least 1.4 per cent but not more than about 115 per cent, coating a glass surface with said dispersion, and heating the coated glass surface to at least 800° F., but not more than 1100° F. to produce a stained glass surface.

18. A method of staining a lime glass surface which comprises forming a finely divided, uniform aqueous dispersion containing silver sulfide and strong mineral acid salts of copper and zince and a water-soluble inorganic chloride compound, in amounts sufficient to stain glass, and in proportions such that, based on the total amount of copper, silver and zinc present, calculated as metals, copper constitutes from about 40 per cent to about 85 per cent, silver from about 2.5 per cent to about 21 per cent, and zinc at least about 20 per cent, and dissolved chlorine, based on the total amount of copper, silver and zinc present, calculated as metals, constitutes at least 1.4 per cent but not more than about 115 per cent, coating a glass surface with said dispersion, and heating the coated glass surface to at least 800° F., but not more than 1100° F. to produce a stained glass surface.

19. A method of staining a lime glass surface which comprises forming a finely divided, uniform aqueous dispersion containing silver sulfide and strong mineral acid salts of copper and zinc and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 20 per cent, and dissolved chlorine, based on the total amount of copper, silver and zinc present, calculated as metals, constitutes at least 1.4 per cent but not more than about 115 per cent, coating a glass surface with said dispersion, and heating the coated glass surface to at least 800° F., but not more than 1100° F. to produce a stained glass surface.

20. A method of staining glass surfaces as claimed in claim 1 wherein the uniform aqueous dispersion includes ochre.

21. A method of staining lime, lead, and borosilicate glass surfaces as claimed in claim 9 wherein the uniform aqueous dispersion includes ochre.

22. A method of staining lime, lead, and borosilicate glass surfaces as claimed in claim 13 wherein the uniform aqueous dispersion includes ochre.

23. A method of staining lime, lead, and borosilicate glass surfaces as claimed in claim 17 wherein the uniform aqueous dispersion includes ochre.

24. A stained glass produced by the method claimed in claim 1.

25. In a method of staining glass surfaces which comprises forming a finely divided, uniform aqueous dispersion containing, as active staining ingredients, copper and silver salts and a water-soluble chloride compound in amounts sufficient to stain glass, coating a glass surface with said dispersion, and heating the coated glass surface to a temperature from about 800° F. to about 1100° F. to produce a stained glass surface, the improvement that consists in incorporating a zinc salt in the uniform liquid dispersion, and using the stated ingredients in proportions such that, based upon the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent.

26. In a method of staining glass surfaces the improvement as claimed in claim 25 wherein the uniform aqueous dispersion contains copper, silver, and zinc sulfides.

27. A method of staining glass surfaces which comprises forming a finely divided, uniform aqueous dispersion containing copper, silver and zinc salts and a water-soluble chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolve chlorine, based on the total amount of copper, silver and zince present, calculated as metals, constitutes at least 1.4 per cent but not more than about 115 per cent, drying the said dispersion, grinding the resulting dried composition with an oil to produce a uniform oil dispersion, coating a glass surface with said oil dispersion, and heating the coated glass surface to at least 800° F. but not more than 1100° F. to produce a stained glass surface.

28. A method of staining a glass surface which comprises forming a finely divided, uniform aqueous dispersion containing silver sulfide and strong mineral acid salts of copper and zinc and a water-soluble inorganic chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 20 per cent, and dissolved chlorine, based on the total amount of copper, silver and zinc present, calculated as metals, constitutes at least 1.4 per cent but not more than about 115 per cent, drying the aqueous dispersion, grinding the resulting dried composition with an oil to produce an oil dispersion, coating a glass surface with said oil dispersion, and heating the coated glass surface to at least 800° F., but not more than 1100° F. to produce a stained glass surface.

29. A composition of matter for staining glass comprising a finely divided, uniform aqueous dispersion containing copper, silver and zinc salts and a water-soluble chloride compound in amounts sufficient to stain glass and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent.

30. A composition of matter for staining glass comprising a finely divided, uniform aqueous dispersion containing copper, silver and zinc salts and a water-soluble chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 1.7 per cent, and dissolved chlorine, based on the total amount of copper, silver and zinc present, calculated as metals, constitutes at least 2.8 per cent but not more than about 115 per cent.

31. A composition of matter for staining glass comprising a finely divided mixture of copper, silver and zinc salts and a chloride compound which mixture, upon addition to water, forms a finely divided aqueous dispersion containing copper, silver and zinc salts and a water-soluble chloride compound in amounts sufficient to stain glass, and in proportions such that, based on the total amount of copper, silver and zinc present, calculated as metals, copper constitutes from about 15 per cent to about 90 per cent, silver at least about 0.875 per cent, and zinc at least about 1.7 per cent, and dissolved chlorine, based on the total amount of copper, silver and zinc present, calculated as metals, constitutes at least 1.4 per cent but not more than about 115 per cent.

32. A composition of matter for staining glass comprising a finely divided mixture of copper, silver and zinc salts and a chloride compound which mixture, upon addition to water, forms a finely divided aqueous dispersion containing copper, silver and zinc salts and a water-soluble chloride compound in amounts sufficient to stain glass, and in proportions such that, based on the total amount of copper, silver and zinc present, calculated as metals, copper constitutes from about 40 per cent to about 85 per cent, silver from about 0.875 per cent to about 21 per cent, and zinc at least about 1.7 per cent, and dissolved chlorine, based on the total amount of copper, silver and zinc present, calculated as metals, constitutes at least 2.8 per cent but not more than about 115 per cent.

ORMONDE S. LEVI.

No references cited.